United States Patent
Tao

(10) Patent No.: US 8,594,513 B2
(45) Date of Patent: Nov. 26, 2013

(54) TIME DELAY ADJUSTMENT DEVICE AND METHOD

(75) Inventor: Zhihui Tao, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 206 days.

(21) Appl. No.: 12/982,609

(22) Filed: Dec. 30, 2010

(65) Prior Publication Data

US 2011/0097091 A1 Apr. 28, 2011

Related U.S. Application Data

(63) Continuation of application No. PCT/CN2009/072038, filed on May 27, 2009.

(30) Foreign Application Priority Data

Jun. 30, 2008 (CN) .......................... 2008 1 0068185

(51) Int. Cl.
*H04B 10/04* (2011.01)
*H03H 11/26* (2006.01)
*H04L 27/06* (2006.01)

(52) U.S. Cl.
USPC ........... 398/183; 398/182; 398/186; 398/147; 375/285; 375/296; 375/324

(58) Field of Classification Search
USPC .................. 398/182, 183; 327/261
See application file for complete search history.

(56) References Cited

U.S. PATENT DOCUMENTS

| | | | |
|---|---|---|---|
| 5,150,128 A * | 9/1992 | Kongelbeck | 342/174 |
| 6,289,048 B1 * | 9/2001 | Richards et al. | 375/235 |
| 2001/0024307 A1 | 9/2001 | Franco et al. | |
| 2003/0109222 A1 * | 6/2003 | Sun et al. | 455/24 |
| 2003/0174783 A1 | 9/2003 | Rahman et al. | |
| 2004/0002318 A1 * | 1/2004 | Kerth et al. | 455/302 |
| 2004/0071438 A1 | 4/2004 | Harres et al. | |
| 2004/0165682 A1 * | 8/2004 | Jun | 375/326 |

(Continued)

FOREIGN PATENT DOCUMENTS

| | | |
|---|---|---|
| CN | 2391311 Y | 8/2000 |
| CN | 101047452 A | 10/2007 |

(Continued)

OTHER PUBLICATIONS

European Patent Office, Extended European Search Report in European Application No. 09 771 936.3-2415 (Dec. 19, 2011).

(Continued)

*Primary Examiner* — Shi K Li
*Assistant Examiner* — Oommen Jacob
(74) *Attorney, Agent, or Firm* — Leydig, Voit & Mayer, Ltd.

(57) ABSTRACT

A time delay adjustment method is provided, which includes the following steps. A same scrambling signal is added into two received signals. The added scrambling signals are then extracted. A delay difference between the two signals is detected according to a difference between the two extracted scrambling signals. The delay difference between the two signals is adjusted by delaying one or both of the two signals. Furthermore, a time delay adjustment device and an optical transmission apparatus are also provided. Therefore, time delay can be adjusted online, and real-time monitoring and adjustment of delay difference is also achieved.

6 Claims, 6 Drawing Sheets

(56) References Cited

U.S. PATENT DOCUMENTS

| | | | |
|---|---|---|---|
| 2005/0008107 A1* | 1/2005 | Brown | 375/343 |
| 2006/0007999 A1* | 1/2006 | Gomez et al. | 375/235 |
| 2006/0078336 A1* | 4/2006 | McNicol et al. | 398/147 |
| 2006/0256911 A1* | 11/2006 | Rosik et al. | 375/376 |
| 2007/0076814 A1* | 4/2007 | Ikeda et al. | 375/297 |
| 2007/0200604 A1 | 8/2007 | Yun et al. | |
| 2007/0296494 A1* | 12/2007 | Hongo | 330/149 |
| 2008/0050125 A1 | 2/2008 | Essiambre et al. | |
| 2008/0054957 A1 | 3/2008 | Takeda et al. | |

FOREIGN PATENT DOCUMENTS

| | | |
|---|---|---|
| DE | 19906194 A1 | 1/2001 |
| DE | 102006034835 A1 | 1/2008 |
| EP | 0524758 A2 | 7/1992 |
| EP | 1109329 A1 | 12/1999 |
| GB | 2397388 A * | 7/2004 |
| WO | WO 2010/000166 A1 | 1/2010 |

OTHER PUBLICATIONS

Written Opinion of the International Searching Authority in corresponding PCT Application No. PCT/CN2009/072038 (Aug. 27, 2009).

Chinese Issue Document in corresponding Chinese Patent Application No. 200810068185.4 (Jun. 30, 2008).

* cited by examiner

TIME DELAY ADJUSTMENT DEVICE AND METHOD

CROSS-REFERENCE TO RELATED APPLICATIONS

This application is a continuation of International Application No. PCT/CN2009/072038, filed on May 27, 2009, which claims priority to Chinese Patent Application No. 200810068185.4, filed on Jun. 30, 2008, both of which are hereby incorporated by reference in their entireties.

FIELD OF THE TECHNOLOGY

The present invention relates to signal processing, and more particularly to a time delay adjustment technology.

BACKGROUND OF THE INVENTION

Signals are affected by dispersion during transmission in an optical fiber. The so-called dispersion refers to waveform distortion of signals caused by different frequency components of the transmitted signal or different transmission speeds of various mode components of signals. The main influence on optical transmission caused by dispersion is intersymbol interference generated between data pulses, and the damage on the system performance caused by dispersion usually cannot be ignored. Therefore, an optical fiber transmission system having a transmission speed higher than 10 Gbit/s generally needs a dispersion compensation technology to ensure a transmission function of the system. Electronics dispersion compensation, especially electronic dispersion pre-compensation (electronic pre distortion, EPD) performed at an originating, has long-distance dispersion compensation capability. As shown in FIG. 1, in an EPD system, a digital signal processor (DSP) sends two signals, the two signals are multiplexed by a multiplexer, the multiplexed signals are converted by a digital-to-analog converter into analog signals, and the analog signals are amplified by an amplifier, so that two signals I and Q are modulated onto a light signal sent by a light source for transmission.

However, due to components and wiring in the circuit, the two signals I and Q usually have a delay difference. The delay difference between the upper signal and the lower signal greatly influences the performance of the EPD system. It is found through practical tests that when the deviation exceeds 0.2 times of the 1/bit cycle, a bit error rate is increased from $10^{-6}$ to about $10^{-4}$. FIG. 2 shows another EPD system in the prior art, in which a phase shifter is connected before the multiplexer to change the delay difference between the two signals I and Q by changing phases.

The inventor finds through in-depth study that in the prior art, the delay difference must be processed in an offline state (that is, when the delay difference is adjusted, no service can be transmitted), the operation is complicated, and real-time monitoring and adjustment of the delay cannot be achieved.

The same problem exists not only in the EPD system but also in other systems in which the delay difference needs to be adjusted.

SUMMARY OF THE INVENTION

By applying the present invention, on-line time delay adjustment is achieved, and real-time monitoring and adjustment of a delay difference is also achieved.

In an embodiment, the present invention provides a time delay adjustment device, which includes a first signal inserter, a first delayer, a first power splitter, a first filter, a second signal inserter, a second power splitter, a second filter, and a controller.

The first signal inserter is configured to receive a first signal, and insert a scrambling signal into the first signal.

The first delayer is configured to delay the signal processed by the first signal inserter.

The first power splitter is configured to extract a part of signal from the signal delayed by the first delayer.

The first filter is configured to filter the signal extracted by the first power splitter, and output the scrambling signal inserted by the first signal inserter.

The second signal inserter is configured to receive a second signal, and insert a scrambling signal into the second signal. The inserted scrambling signal is the same as that inserted by the first signal inserter.

The second power splitter is configured to extract a part of signal from the signal output by the second signal inserter.

The second filter is configured to filter the signal extracted by the second power splitter, and output the scrambling signal inserted by the second signal inserter.

The controller is configured to receive signals sent by the first filter and the second filter, detect a delay difference between the two signals according to a difference between the two signals, and change the delay difference between the two signals by adjusting a delay of the first delayer.

In an embodiment, the present invention provides another optical transmission apparatus, which includes a digital signal processor, a time delay adjustment device, a light source, and a modulator.

The digital signal processor is configured to transmit a first digital signal and a second digital signal.

The time delay adjustment device is configured to adjust a delay difference between the first digital signal and the second digital signal during transmission of the signals.

The light source is configured to generate a light signal.

The modulator is configured to modulate two signals adjusted by the time delay adjustment device onto the light signal, and send the modulated light signal.

The time delay adjustment device includes a first signal inserter, a first digital-to-analog converter, a first delayer, a first power splitter, a first filter, a second signal inserter, a second digital-to-analog converter, a second power splitter, a second filter, and a controller.

The first signal inserter is configured to receive a first digital signal, and insert a scrambling signal into the first digital signal.

The first digital-to-analog converter is configured to convert the signal processed by the first signal inserter into an analog signal.

The first delayer is configured to delay the analog signal converted by the first digital-to-analog converter.

The first power splitter is connected to the modulator and the first delayer, and configured to extract a part of signal from the signal delayed by the first delayer.

The first filter is configured to filter the signal extracted by the first power splitter, and output the scrambling signal inserted by the first signal inserter.

The second signal inserter is configured to receive a second digital signal, and insert a scrambling signal into the second digital signal. The inserted scrambling signal is the same as that inserted by the first signal inserter.

The second digital-to-analog converter is configured to convert the signal processed by the second signal inserter into an analog signal.

The second power splitter is connected to the modulator and the second analog-to-digital converter, and configured to extract a part of signal from the signal converted by the second analog-to-digital converter.

The second filter is configured to filter the signal extracted by the second power splitter, and output the scrambling signal inserted by the second signal inserter.

The controller is configured to receive signals output by the first filter and the second filter, detect a delay difference between the two signals according to a difference between the two signals, and change the delay difference between the two signals by adjusting the first delayer.

In an embodiment, the present invention provides a fourth optical transmission apparatus, which includes a digital signal processor, a time delay adjustment device, a light source, and a modulator.

The digital signal processor is configured to transmit a first digital signal and a second digital signal.

The time delay adjustment device is configured to adjust a delay difference between the first digital signal and the second digital signal during transmission of the signals.

The light source is configured to generate a light signal.

The modulator is configured to modulate two signals adjusted by the time delay adjustment device onto the light signal, and send the modulated light signal.

The time delay adjustment device includes a first signal inserter, a first delayer, a first digital-to-analog converter, a first power splitter, a first filter, a second signal inserter, a second digital-to-analog converter, a second power splitter, a second filter, and a controller.

The first signal inserter is configured to receive a first digital signal, and insert a scrambling signal into the first digital signal.

The first delayer is configured to delay the signal processed by the first signal inserter.

The first digital-to-analog converter is configured to convert the signal processed by the first delayer into an analog signal.

The first power splitter is connected to the modulator and the first analog-to-digital converter, and configured to extract a part of signal from the signal converted by the first analog-to-digital converter.

The first filter is configured to filter the signal extracted by the first power splitter, and output the scrambling signal inserted by the first signal inserter.

The second signal inserter is configured to receive a second digital signal, and insert a scrambling signal into the second digital signal. The inserted scrambling signal is the same as that inserted by the first signal inserter.

The second digital-to-analog converter is configured to convert the signal processed by the second delayer into an analog signal.

The second power splitter is connected to the modulator and the second analog-to-digital converter, and configured to extract a part of signal from the signal converted by the second analog-to-digital converter.

The second filter is configured to filter the signal extracted by the second power splitter, and output the scrambling signal inserted by the second signal inserter.

The controller is configured to receive signals output by the first filter and the second filter, detect a delay difference between the two signals according to a difference between the two signals, and change the delay difference between the two signals by adjusting the first delayer.

In an embodiment, the present invention provides a time delay adjustment method, which includes the following steps:

Two signals are received.

A same scrambling signal is added into the two signals, and at least one of the two signals is delayed.

The added scrambling signals are extracted from the two signals separately.

A delay difference between the two signals is detected according to a difference between the two extracted scrambling signals, and the delay difference between the two signals is adjusted by delaying at least one of the two signals.

According to the present invention, the delay difference is detected by detecting the inserted scrambling signals, the delay is adjusted by using a controller, so that on-line adjustment of delay time for the optical transmission apparatus is achieved, the operation is simple and quick, and moreover, real-time monitoring and adjustment of delay difference is also achieved.

DETAILED DESCRIPTION OF THE EMBODIMENTS

Hereinafter, the present invention is described in detail with reference to the drawings and the embodiments.

First Embodiment

Figure 1:
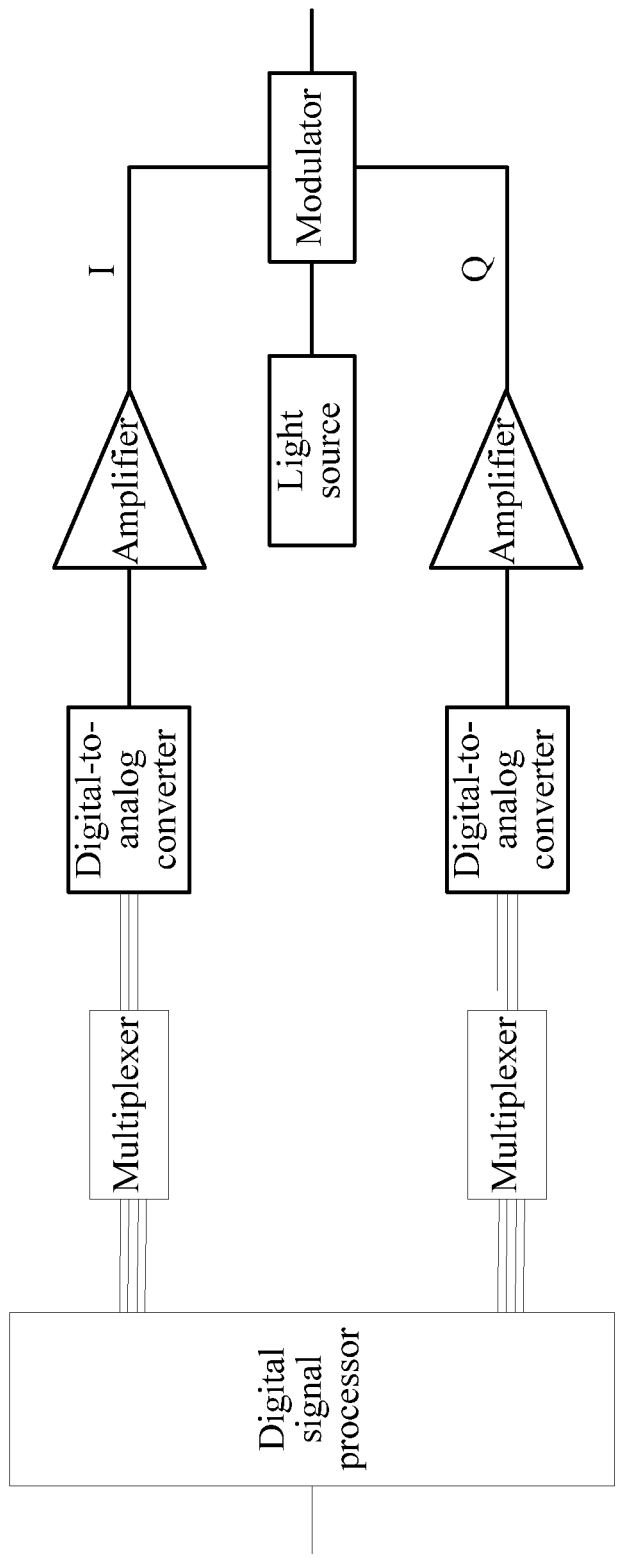
FIG. 1 is a schematic diagram of an electronic dispersion pre-compensation system in the prior art.
Figure 2:
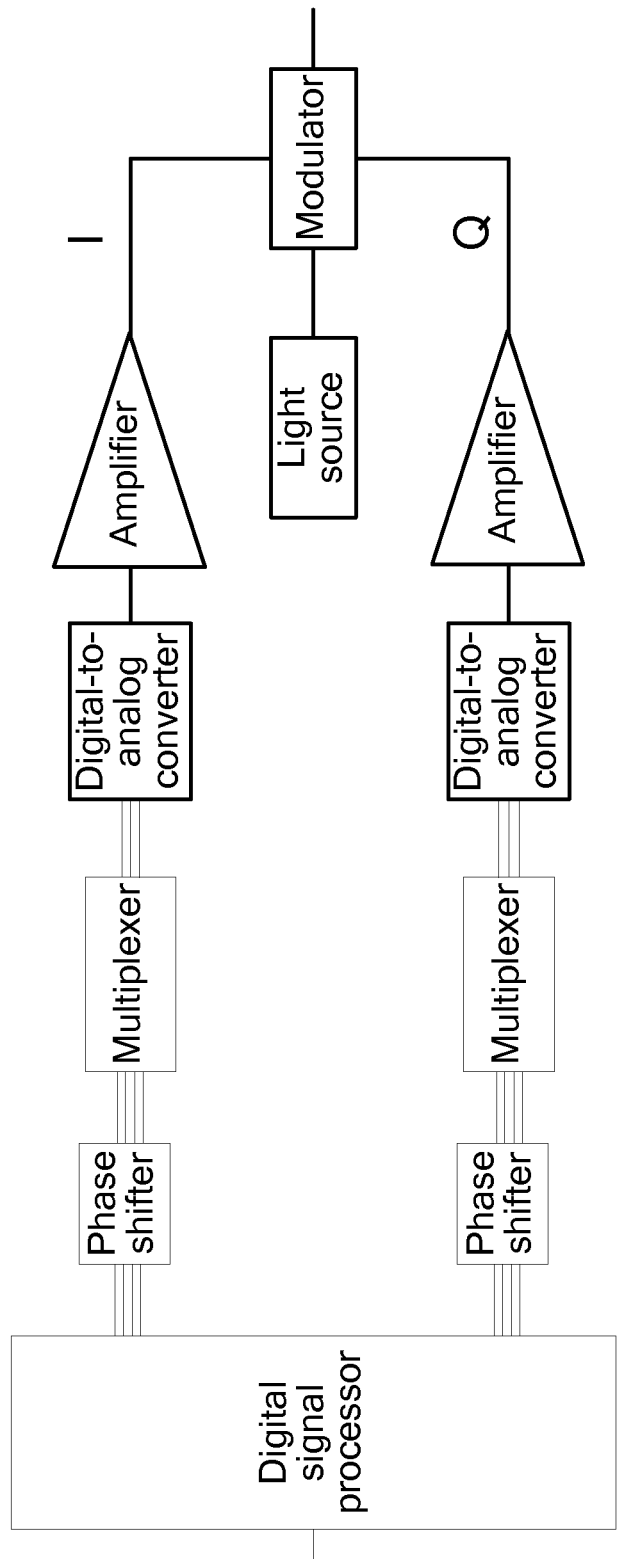
FIG. 2 is a schematic diagram of another electronic dispersion pre-compensation system in the prior art.
Figure 3:
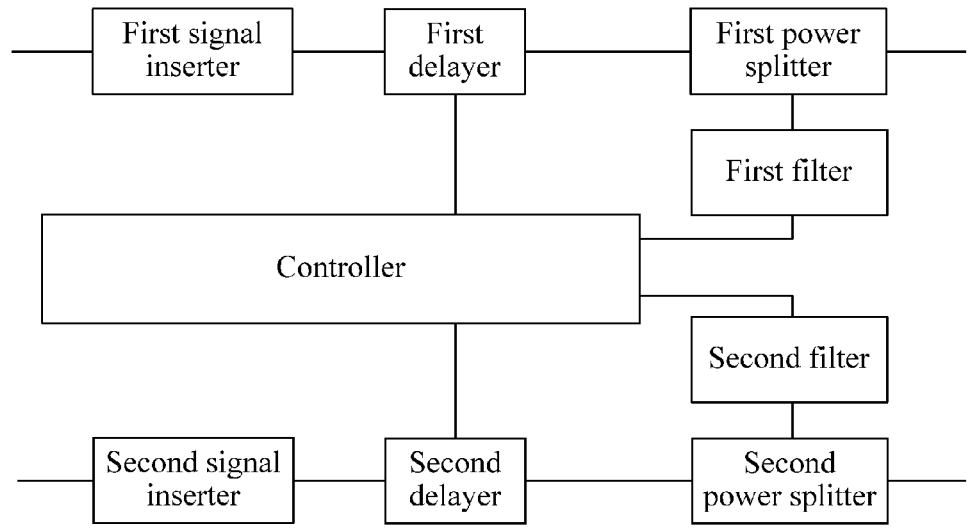
FIG. 3 is a schematic diagram of a time delay adjustment device according to a first embodiment of the present invention.

Referring to FIG. 3, in this embodiment, a time delay adjustment device is provided. The device includes a controller and two groups of a signal inserter, a delayer, a power splitter, and a filter that are connected in sequence.

A first signal inserter is configured to receive a first signal and insert a scrambling signal into the signal. The scrambling signal is, for example, a single frequency scrambling $A^1 \sin(\omega^1 t)$, or multiple single frequency scrambling $A^1 \sin(\omega^1 t) + A^2 \sin(\omega^2 t) + \ldots + A^n \sin(\omega^n t)$, in which the n is a natural number, and the $A^n$ and $\omega^n$ are rational numbers. A first delayer is configured to delay the signal processed by the first signal inserter. A first power splitter is configured to extract a part of (for example, 5%) signal from the signal delayed by the first delayer. A first filter is configured to filter the signal extracted by the first power splitter, and output the scrambling signal inserted by the first signal inserter.

A second signal inserter is configured to receive a second signal, and insert a scrambling signal into the signal. The inserted scrambling signal is the same as that inserted by the first signal inserter. A second delayer is configured to delay the signal processed by the second signal inserter. A second power splitter is configured to extract a part of (for example, 5%) signal from the signal delayed by the second delayer. A second filter is configured to filter the signal extracted by the second power splitter, and output the scrambling signal inserted by the second signal inserter.

The controller is connected to the first delayer, the second delayer, the first filter, and the second filter, is configured to receive signals output by the first filter and the second filter, detect a delay difference by calculating an amplitude of a difference between the two signals, and control the delay difference between the two signals by delaying the first delayer and/or the second delayer. Optionally, the controller may be connected to the first signal inserter and the second signal inserter, and control the scrambling signal corresponding to the first signal inserter and the second signal inserter.

It is assumed that signals received by the first signal inserter and the second signal inserter are $E^1(t)$ and $E^2(t)$, respectively, the scrambling signal is $A^1 \sin(\omega^1 t)$, the delay generated by the second signal with respect to the first signal during transmission is $\tau$, so that after the scrambling signal, the two signals are $$X^1 = E^1(t) + A^1 \sin(\omega^1 t) \quad (1)$$

$$X^2 = E^2(t-\tau) + A^1 \sin \omega^1(t-\tau) \quad (2).$$

The filter outputs a signal with a frequency of $\omega^1$ and the two signals are subtracted to obtain the following formula:

$$2A^1 \sin(\omega^1 \tau/2)\cos \omega^1(t-\tau/2) \quad (3).$$

The amplitude of the signal in formula (3) varies with time t, and the cycle is $\omega^1$ and remains unchanged. Therefore, the delay difference between the two signals can be determined according to the amplitude of the signal. If $M = 2A^1 \sin(\omega^1 \tau/2)$, the M is amplitude, such that the delay difference is determined.

When the delay difference $\tau$ needs to be adjusted to be $t^0$, it can be known from formula (3) that, the controller generates a control voltage to adjust the first delayer and/or the second delayer to minimize $2A^1 \sin \omega^1(\tau/2 - t^0/2)$, that is, $M = 2A^1 \sin(\omega^1 t^0/2)$.

In this embodiment, when the scrambling signal is $A^1 \sin(\omega^1 t) + A^2 \sin(\omega^2 t) + \ldots + A^n \sin(\omega^n t)$, the difference is that the two signals are subtracted to obtain $2A^1 \sin(\omega^1 \tau/2)\cos \omega^1(t-\tau/2) + 2A^2 \sin(\omega^2 \tau/2)\cos \omega^2(t-\tau/2) + \ldots + 2A^n \sin(\omega^n \tau/2) \cos \omega^n(t-\tau/2)$.

Therefore, the filter has more options and may select a signal at a certain frequency for filtering. The filter filters a signal at a certain frequency, and formula (3) changes into $$2A^n \sin(\omega^n \tau/2)\cos \omega^n(t-\tau/2) \quad (4).$$

As the method is not essentially different from the previous method, detailed description of the method is omitted here. Meanwhile, as for a non-sinusoidal signal, according to the Fourier theorem, the signal may be extended by using the Fourier series, while the Fourier function is formed by sine functions. For example, a square wave is superimposition of multiple sine waves, which also falls within the scope of the embodiments of the present invention.

In this embodiment, the first signal inserter and the second signal inserter only need to have signal insertion functions, for example, an amplifier or offset T.

Figure 4:
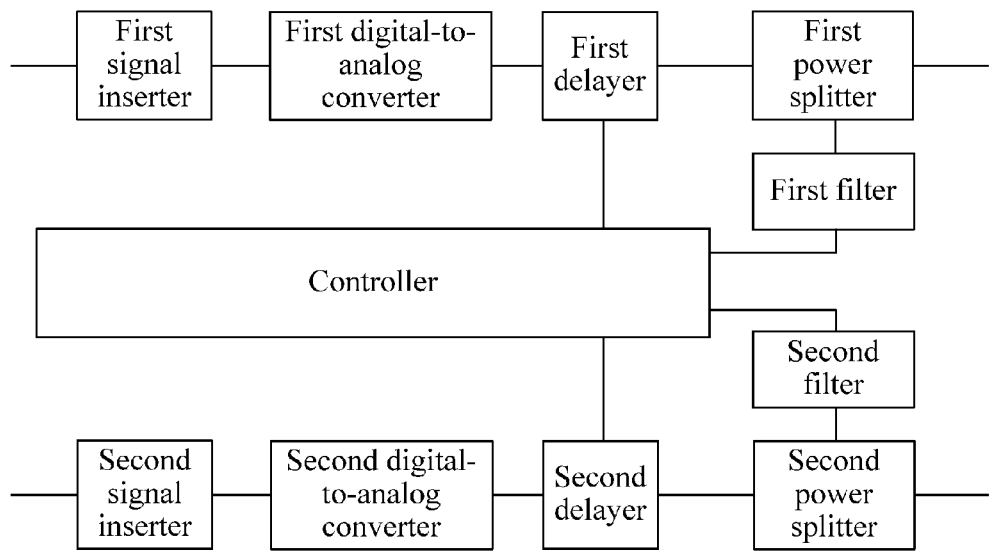
FIG. 4 is a schematic diagram of another time delay adjustment device according to a first embodiment of the present invention.

In this embodiment, when the first signal and the second signal are digital signals, a first digital-to-analog converter and a second digital-to-analog converter may be added. The first digital-to-analog converter is disposed between the first signal inserter and the first delayer or between the first delayer and the first power splitter and configured to perform digital-to-analog conversion on the signal before the first signal inserter sends the signal to the first delayer or before the first delayer sends the signal to the first power splitter. The second digital-to-analog converter is disposed between the second signal inserter and the second delayer or between the second delayer and the second power splitter and configured to perform digital-to-analog conversion on the signal before the second signal inserter sends the signal to the second delayer or before the second delayer sends the signal to the second power splitter. FIG. 4 shows another time delay adjustment device according to the first embodiment, in which the first digital-to-analog converter is disposed between the first signal inserter and the first delayer and the second digital-to-analog converter is disposed between the second signal inserter and the second delayer. The situations in which the first digital-to-analog converter and the second digital-to-analog converter are disposed at other positions are not shown in FIG. 4.

In this embodiment, the first filter and the second filter only need to have a function of outputting a signal at a certain frequency, for example, a bandpass filter, a high-pass filter, and a low-pass filter.

By applying this embodiment, on-line delay adjustment can be achieved, the operation is simple and delay adjustment is rapid, and real-time monitoring and adjustment of delay difference is also achieved. When multiple-single-frequency scrambling serves as a scrambling signal, as multiple frequencies are optional, the reliability is improved.

Second Embodiment

Figure 5:
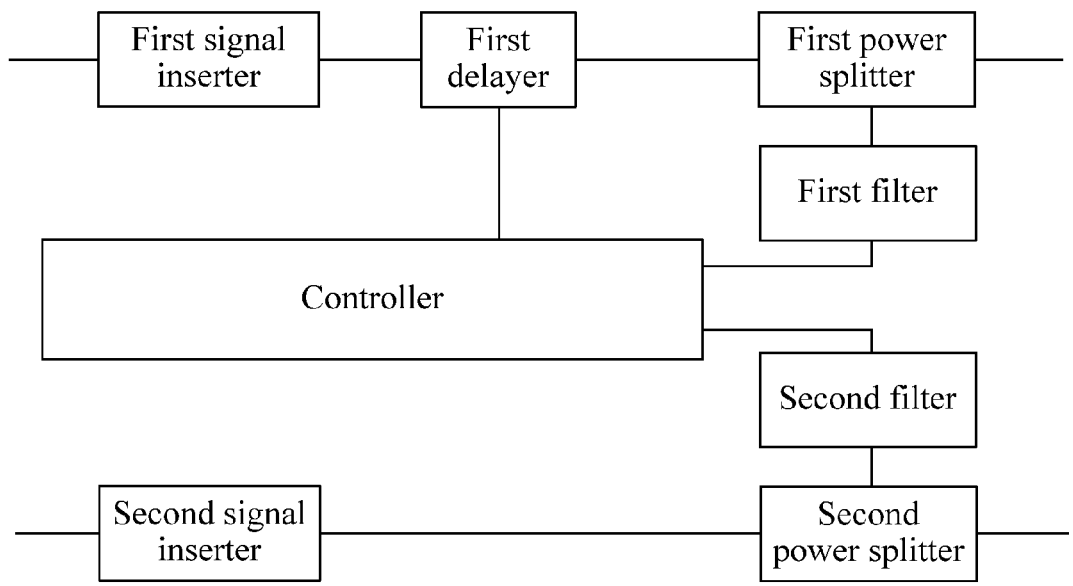
FIG. 5 is a schematic diagram of a time delay adjustment device according to a second embodiment of the present invention.

Referring to FIG. 5, this embodiment is substantially the same as the first embodiment. The difference between the second embodiment and the first embodiment is that in the second embodiment, only one delayer exists and the controller adjusts the first delayer to adjust the delay difference between the two signals.

It should be noted that because the delayer may cause a certain delay on the signal, in the first embodiment, the two signals are subjected to the influence of the delayers. When the influence is the same, the delay on the two signals of the delayers are counteracted and may need to be considered. In this embodiment, it is necessary to consider the delay of the first delayer.

If the first delayer is not considered, a delay of the first signal with respect to the second signal is $\tau$, and the first delayer may cause a delay $\Delta\tau$, so that the delay in total is $\tau + \Delta\tau$.

It should be noted that although FIG. 5 shows merely the situation in which no digital-to-analog converter exists, this is merely for ease of description. Persons skilled in the art should know that various situations in the first embodiment may also be used in the second embodiment. That is, a digital-to-analog converter may exist or may not exist. In this regard, the same situation may also exist in other embodiments, for example, in a third embodiment, only a first delayer exists. For ease of description, the situations that are similar to this embodiment will not be described in the other embodiments.

By applying this embodiment, on-line delay adjustment can be achieved, the operation is simple, the delay adjustment is rapid, and real-time monitoring and adjustment of the delay difference is also achieved. When multiple-single-frequency scrambling serves as a scrambling signal, multiple frequencies are optional, so that the reliability is improved. Compared with the first embodiment, the cost is reduced.

Third Embodiment

Figure 6:
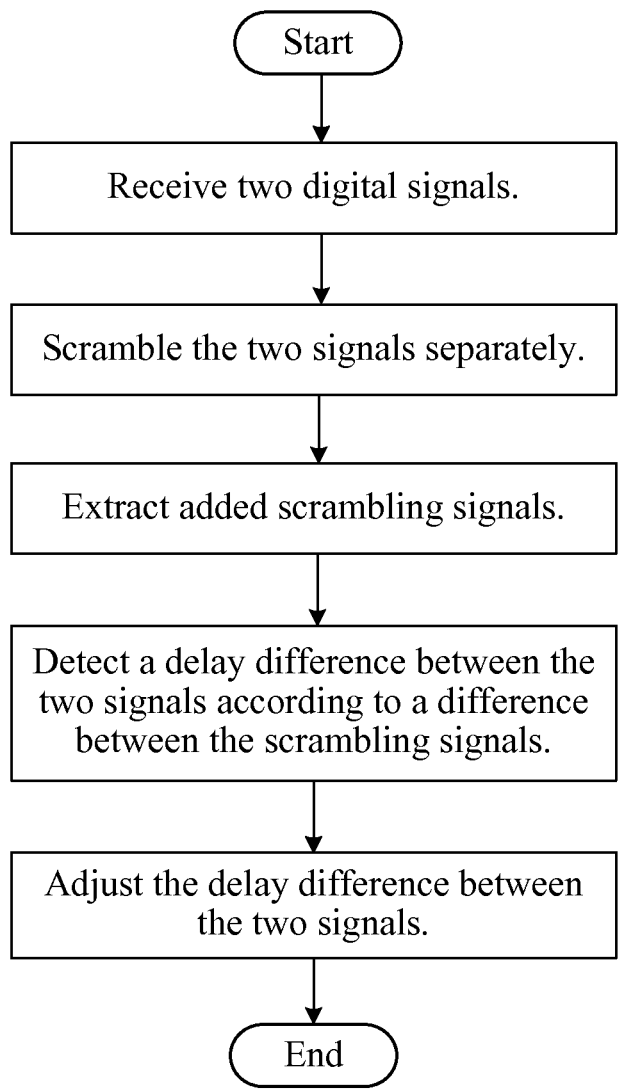
FIG. 6 is a flow chart of a time delay adjustment method according to a third embodiment of the present invention.

Referring to FIG. 6, in this embodiment, a time delay adjustment method is provided, which is applied to the device in the first and second embodiments. The method includes the following steps. Two digital signals are received. A same scrambling signal is added into the two signals and at least one of the two signals is delayed. The added scrambling signals are extracted from the two signals. The delay difference between the two signals is detected according to the difference between the two scrambling signals and the delay difference between the two signals are adjusted by delaying at least one of the two signals.

It is assumed that two signals are $E^1(t)$ and $E^2(t)$ and the scrambling signal is a single frequency scrambling $A^1 \sin(\omega^1 t)$, the delay generated by the second signal with respect to the first signal during transmission is $\tau$. After the scrambling signals are added, the two signals are respectively:

$$X^1 = E^1(t) + A^1 \sin(\omega^1 t) \qquad (1)$$

$$X^2 = E^2(t-\tau) + A^1 \sin \omega^1(t-\tau) \qquad (2).$$

A signal with a frequency $\omega^1$ is extracted and the two signals are subtracted to obtain the following formula:

$$2A^1 \sin(\omega^1 \tau/2) \cos \omega^1(t-\tau/2) \qquad (3).$$

The signal amplitude of formula (3) varies with time t, and the cycle is $\omega^1$ and remains unchanged. Therefore, the delay difference between the two signals can be determined according to the amplitude of the signal. If $M=2A^1 \sin(\omega^1 \tau/2)$, M is amplitude, the delay difference is determined.

When the delay difference $\tau$ needs to be adjusted to be $t^0$, it can be known from formula (3) that the controller generates a control voltage to adjust the first delayer and/or the second delayer to minimize $2A^1 \sin \omega^1 (\tau/2-t^0/2)$, that is, $M=2A^1 \sin(\omega^1 t^0/2)$.

In this embodiment, when the scrambling signal is $A^1 \sin(\omega^1 t) + A^2 \sin(\omega^2 t) + \ldots + A^n \sin(\omega^n t)$, the difference is that the two signals are subtracted to obtain $2A^1 \sin(\omega^1 \tau/2) \cos \omega^1(t-\tau/2) + 2A^2 \sin(\omega^2 \tau/2) \cos \omega^2(t-\tau/2) + \ldots + 2A^n \sin(\omega^n \tau/2) \cos \omega^n(t-\tau/2)$.

Therefore, the filter has many options, and may select a signal of a certain frequency for filtering. A signal at a certain frequency is filtered by the filter, and formula (3) changes to be:

$$2A^n \sin(\omega^n \tau/2) \cos \omega^n(t-\tau/2) \qquad (4).$$

As the method is not essentially different from the previous method, the description of the method is omitted. Meanwhile, as for a non-sinusoidal signal, according to the Fourier theorem, the signal may be extended by using the Fourier series, while the Fourier function is formed by sine functions. For example, a square wave is superimposition of multiple sine waves, which also falls within the scope of this embodiment of the present invention. Multiple-single-frequency scrambling is not essentially different from the previous method, the description of which is omitted here.

When three or more signals are received by using the method of the present invention, the embodiment of the present invention needs to be repeated only to ensure the delay difference between all two signals, so that the delay difference between all the signals are ensured. For example, it is assumed that three signals A, B, and C exist, as long as that the delay difference between B and C with respect to A is no higher than $t^1$, the delay difference between the three signals A, B, and C are not greater than $t^1$. Therefore, delay processing on three or more signals is applicable to the present invention is. For ease of description, the situation is no longer described in the other embodiments.

As the processing of relations of the steps is substantially based on the same idea as the device embodiments of the present invention and may refer to the description in the first and second embodiments, the description is no longer repeated here.

By applying this embodiment, on-line delay adjustment can be achieved, the operation is simple, delay adjustment is quick, and real-time monitoring and adjustment of the delay difference is also achieved. When multiple-single-frequency scrambling serves as a scrambling signal, multiple frequencies are optional, so that the reliability is improved.

Fourth Embodiment

Figure 7:
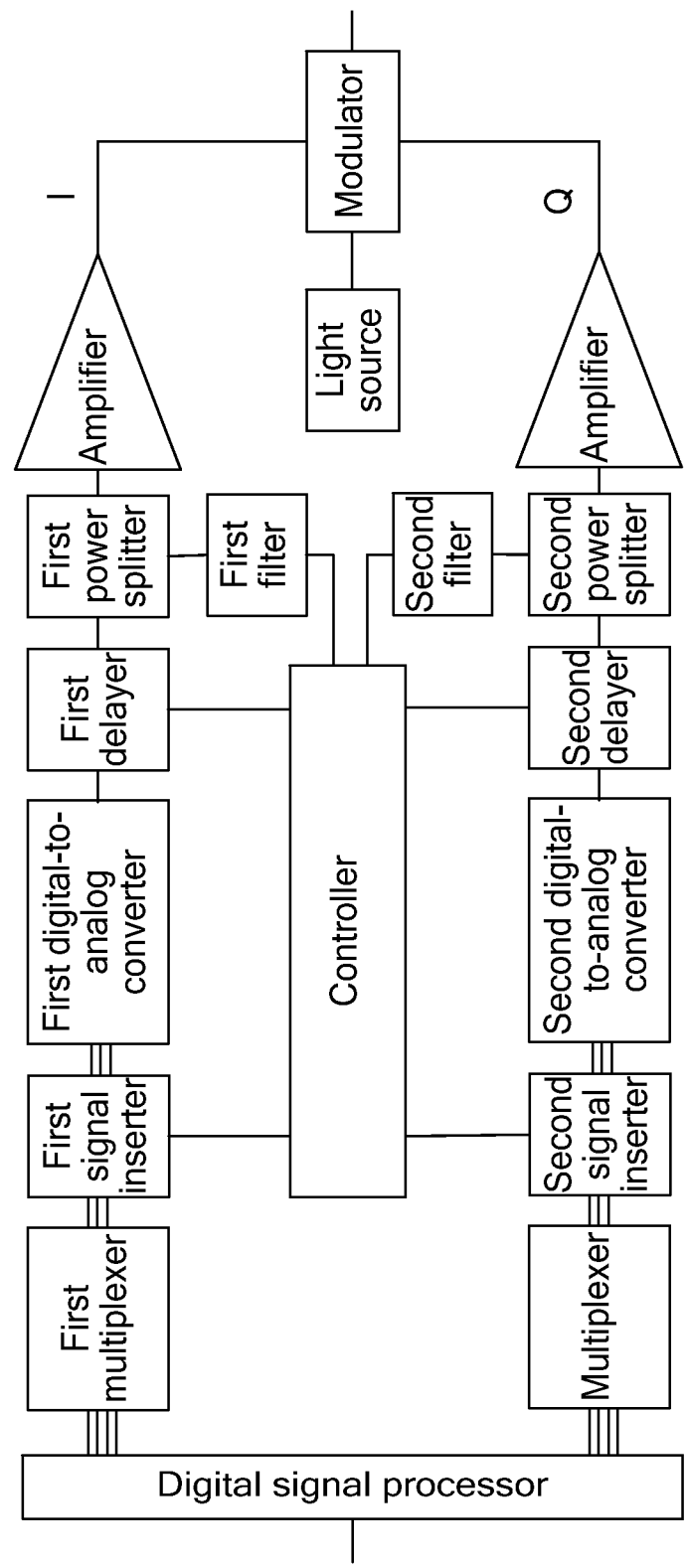
FIG. 7 is a schematic diagram of an optical transmission apparatus according to a fourth embodiment of the present invention.

Referring to FIG. 7, an optical transmission apparatus is provided, for example, an electronic dispersion pre-compensation device, which includes a digital signal processor and a time delay adjustment device.

The digital signal processor is configured to transmit a first digital signal, a second digital signal, a light source, and a modulator.

The time delay adjustment device is configured to adjust a delay difference between the first digital signal and the second digital signal during transmission of the signals. The light source is configured to generate a light signal. The modulator is configured to modulate the two signals adjusted by the time delay adjustment device onto the light signal and send the modulated light signal.

The time delay adjustment device includes a first signal inserter, a first digital-to-analog converter, a first delayer, a first power splitter, a first filter, a second signal inserter, a second digital-to-analog converter, a second delayer, a second power splitter, a second filter, and a controller. The first signal inserter is configured to receive the first digital signal and insert a scrambling signal into the first digital signal. The first digital-to-analog converter is configured to convert the signal processed by the first signal inserter into an analog signal. The first delayer is configured to delay the analog signal converted by the first digital-to-analog converter. The first power splitter is connected to the modulator and the first delayer and configured to extract a part of signal from the signal delayed by the first delayer. The first filter is configured to filter the signal extracted by the first power splitter and output the scrambling signal inserted by the first signal inserter.

The second signal inserter is configured to receive the second digital signal and insert a scrambling signal into the first digital signal. The inserted scrambling signal is the same as the scrambling signal inserted by the first signal inserter. The second digital-to-analog converter is configured to convert the signal processed by the second signal inserter into an analog signal. The second delayer is configured to delay the analog signal converted by the second digital-to-analog converter. The second power splitter is connected to the modulator and the second delayer and configured to extract a part of signal from the signal delayed by the second delayer. The second filter is configured to filter the signal extracted by the second power splitter and output the scrambling signal inserted by the second signal inserter. The controller is configured to receive signals output by the first filter and the second filter, detect a delay difference between the two signals according to a difference between the two signals, and change the delay difference between the two signals by adjusting the first delayer and/or the second delayer.

When the first signal inserter and the second signal inserter are amplifiers, the electronic dispersion compensation device may no longer need an additional amplifier. When the first signal inserter and the second signal inserter are other components such as an offset T and do not have enough amplification function, amplifiers are added between the two outputs of the time delay adjustment device and the modulator respectively.

The optical transmission apparatus of this embodiment is characterized in that the time delay adjustment device is different from that in the prior art, and the time delay adjustment device and the method corresponding to the device, and various combinations and optional situations are described in detail in the previous embodiments (see the first, second, and third embodiments), which is no longer described here.

By applying this embodiment, on-line delay adjustment of the optical transmission apparatus can be achieved, the operation is simple, delay adjustment is rapid, and real-time monitoring and adjustment of delay difference is also achieved. When multiple-single-frequency scrambling serves as a scrambling signal, multiple frequencies are optional, so that the reliability is improved.

It should be noted that the above embodiments are merely provided for elaborating the technical solutions of the present invention, but not intended to limit the present invention. Although the present invention has been described in detail with reference to the foregoing embodiments, it is apparent that person having ordinary skill in the art can make various modifications or equivalent replacements to the technical solutions of the invention without departing from the principle and scope of the invention. Any modification, equivalent replacement, or improvement made without departing from the principle of the present invention should fall within the scope of the present invention.

The invention claimed is:

1. A time delay adjustment device, comprising:
 a first signal inserter, configured to receive a first signal, and insert a scrambling signal into the first signal;
 a first delayer, configured to delay the signal processed by the first signal inserter;
 a first power splitter, configured to extract a part of signal from the signal delayed by the first delayer;
 a first filter, configured to filter the signal extracted by the first power splitter, and output the scrambling signal inserted by the first signal inserter;
 a second signal inserter, configured to receive a second signal, and insert a scrambling signal into the second signal, wherein the inserted scrambling signal is the same as that inserted by the first signal inserter;
 a second power splitter, configured to extract a part of signal from the signal output by the second signal inserter;
 a second filter, configured to filter the signal extracted by the second power splitter, and output the scrambling signal inserted by the second signal inserter; and
 a controller, configured to receive signals sent by the first filter and the second filter, detect a delay difference between the two signals according to a difference between the two signals, and change the delay difference between the two signals by adjusting a delay of the first delayer.

2. The device according to claim 1, further comprising:
 a second delayer, configured to delay the signal processed by the second signal inserter, wherein the second power splitter extracts a part of signal from the signal delayed by the second delayer, and
 the controller detects the delay difference between the two signals according to the difference between the received signals sent by the first filter and the second filter, changes the delay difference between the two signals by adjusting the delay of the first delayer and/or the second delayer.

3. The device according to claim 1 or 2, when the first signal is a digital signal, further comprising:
 a first digital-to-analog converter, disposed between the first signal inserter and the first delayer, and configured to perform digital-to-analog conversion on a signal before the first signal inserter sends the signal to the first delayer; or
 a first digital-to-analog converter, disposed between the first delayer and the first power splitter, and configured to perform digital-to-analog conversion on the signal before the first delayer sends the signal to the first power splitter; and
when the second signal is a digital signal, further comprising:
 a second digital-to-analog converter, disposed between the second signal inserter and the second delayer, and configured to perform digital-to-analog conversion on the signal before the second signal inserter sends the signal to the second delayer; or
 a second digital-to-analog converter, disposed between the second delayer and the second power splitter, and configured to perform digital-to-analog conversion on the signal before the second delayer sends the signal to the second power splitter.

4. The device according to claim 1 or 2, wherein
the controller detects the delay difference between the two signals according to an amplitude of the difference between the two signals.

5. An optical transmission apparatus, comprising:
 a digital signal processor, configured to transmit a first digital signal and a second digital signal;
 a time delay adjustment device, configured to adjust a delay difference between the first digital signal and the second digital signal during transmission;
 a light source, configured to generate a light signal;
 a modulator, configured to modulate two signals adjusted by the time delay adjustment device onto the light signal, and send the modulated light signal;
wherein the time delay adjustment device comprises:
 a first signal inserter, configured to receive a first digital signal, and insert a scrambling signal into the first digital signal;
 a first digital-to-analog converter, configured to convert the signal processed by the first signal inserter into an analog signal;
 a first delayer, configured to delay the analog signal converted by the first digital-to-analog converter;
 a first power splitter, connected to the modulator and the first delayer, and configured to extract a part of signal from the signal delayed by the first delayer;
 a first filter, configured to filter the signal extracted by the first power splitter, and output the scrambling signal inserted by the first signal inserter;
 a second signal inserter, configured to receive a second digital signal, and insert a scrambling signal into the second digital signal, wherein the inserted scrambling signal is the same as that inserted by the first signal inserter;
 a second digital-to-analog converter, configured to convert the signal processed by the second signal inserter into an analog signal;
 a second power splitter, connected to the modulator and the second analog-to-digital converter, and configured to extract a part of signal from the signal converted by the second analog-to-digital converter;

a second filter, configured to filter the signal extracted by the second power splitter, and output the scrambling signal inserted by the second signal inserter; and a controller, configured to receive signals output by the first filter and the second filter, detect a delay difference between the two signals according to a difference between the two signals, and change the delay difference between the two signals by adjusting the first delayer.

6. An optical transmission apparatus, comprising:

a digital signal processor, configured to transmit a first digital signal and a second digital signal;

a time delay adjustment device, configured to adjust the delay difference between the first digital signal and the second digital signal during transmission of the signals;

a light source, configured to generate a light signal;

a modulator, configured to modulate two signals adjusted by the time delay adjustment device onto the light signal, and send the modulated light signal;

wherein the time delay adjustment device comprises:

a first signal inserter, configured to receive a first digital signal, and insert a scrambling signal into the first digital signal;

a first delayer, configured to delay the signal processed by the first signal inserter;

a first digital-to-analog converter, configured to convert the signal processed by the first delayer into an analog signal;

a first power splitter, connected to the modulator and the first analog-to-digital converter, and configured to extract a part of signal from the signal converted by the first analog-to-digital converter;

a first filter, configured to filter the signal extracted by the first power splitter, and output the scrambling signal inserted by the first signal inserter;

a second signal inserter, configured to receive a second digital signal, and insert a scrambling signal into the second digital signal, wherein the inserted scrambling signal is the same as that inserted by the first signal inserter;

a second digital-to-analog converter, configured to convert the signal processed by the second delayer into an analog signal;

a second power splitter, connected to the modulator and the second analog-to-digital converter, and configured to extract a part of signal from the signal converted by the second analog-to-digital converter;

a second filter, configured to filter the signal extracted by the second power splitter, and output the scrambling signal inserted by the second signal inserter; and a controller, configured to receive signals output by the first filter and the second filter, detect a delay difference between the two signals according to a difference between the two signals, and change the delay difference between the two signals by adjusting the first delayer.

* * * * *